R. H. BLACKALL.
RATCHET MECHANISM FOR BLIND END CARS.
APPLICATION FILED JUNE 28, 1915.
1,167,261.
Patented Jan. 4, 1916.
2 SHEETS—SHEET 1.
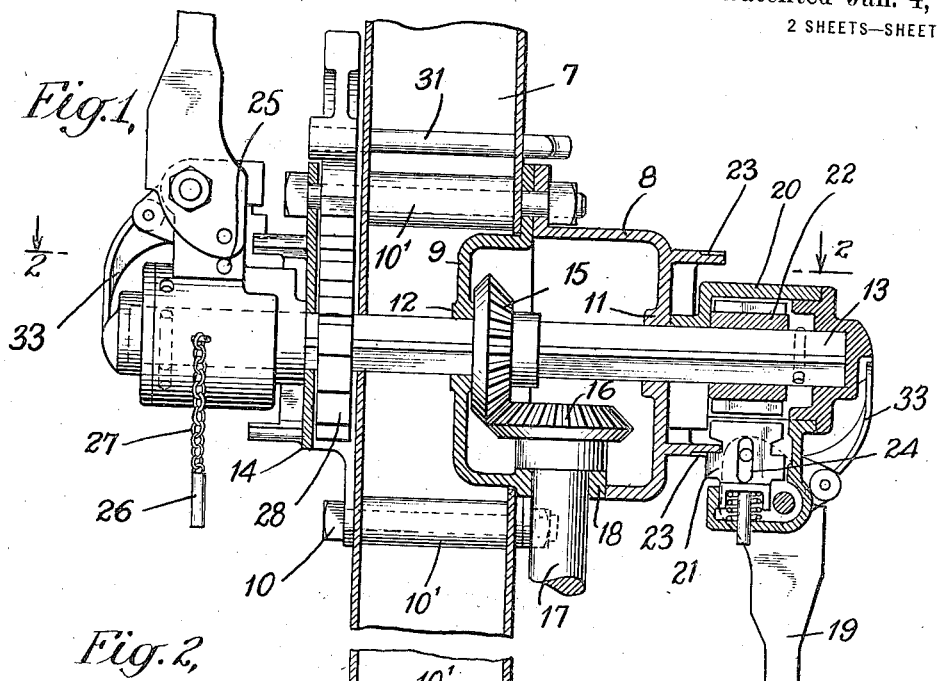
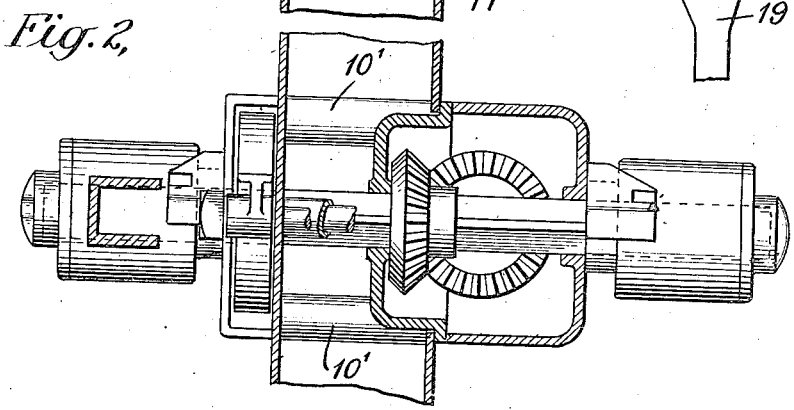
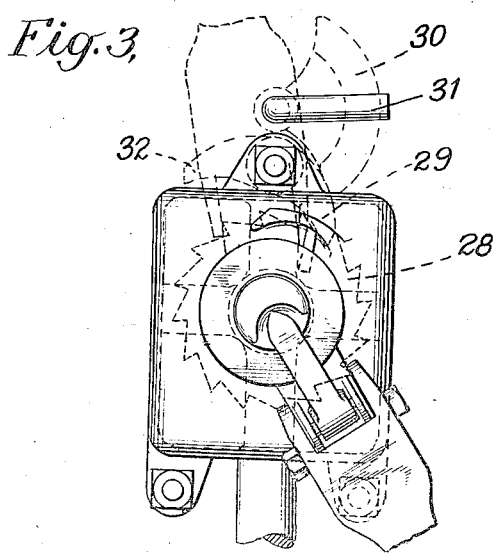
INVENTOR
Robert H. Blackall
BY
Pennie Davis & Marvin
ATTORNEYS R. H. BLACKALL.
RATCHET MECHANISM FOR BLIND END CARS.
APPLICATION FILED JUNE 28, 1915.

1,167,261.

Patented Jan. 4, 1916.
2 SHEETS—SHEET 2.

INVENTOR
Robert H. Blackall
BY
Bonnie Davis & Marvin
ATTORNEYS

UNITED STATES PATENT OFFICE.

ROBERT H. BLACKALL, OF PITTSBURGH, PENNSYLVANIA, ASSIGNOR TO RATCHET BRAKE COMPANY, OF NEW YORK, N. Y., A CORPORATION OF DELAWARE.

RATCHET MECHANISM FOR BLIND-END CARS.

1,167,261.  Specification of Letters Patent.  Patented Jan. 4, 1916.

Application filed June 28, 1915. Serial No. 36,773.

*To all whom it may concern:*

Be it known that I, ROBERT H. BLACKALL, a citizen of the United States, residing in Pittsburgh, Allegheny county, State of Pennsylvania, have invented certain new and useful Improvements in Ratchet Mechanism for Blind-End Cars; and I do hereby declare the following to be a full, clear, and exact description of the invention, such as will enable others skilled in the art to which it appertains to make and use the same.

This invention relates to brake actuating mechanism and more particularly to mechanism of the type which is carried by the blind end of baggage and express cars and the like, and is used for rotating the brake shaft upon which the brake operating chain is wound.

The purpose of this invention is to provide brake actuating mechanism for use in connection with cars having blind ends, comprising a vertical brake shaft geared to a horizontal shaft which extends through the wall of the car and carries upon its inner and outer ends hand actuated ratchet mechanism for rotating the horizontal shaft when the brakes are to be set.

A feature of the invention consists in so constructing the ratchet mechanism as to permit the brakes to be released by a movement of the ratchet mechanism in a reverse direction to positively unwind the brake chain in case it becomes tangled on the staff or wedged against the staff support, as sometimes occurs.

Figure 4:
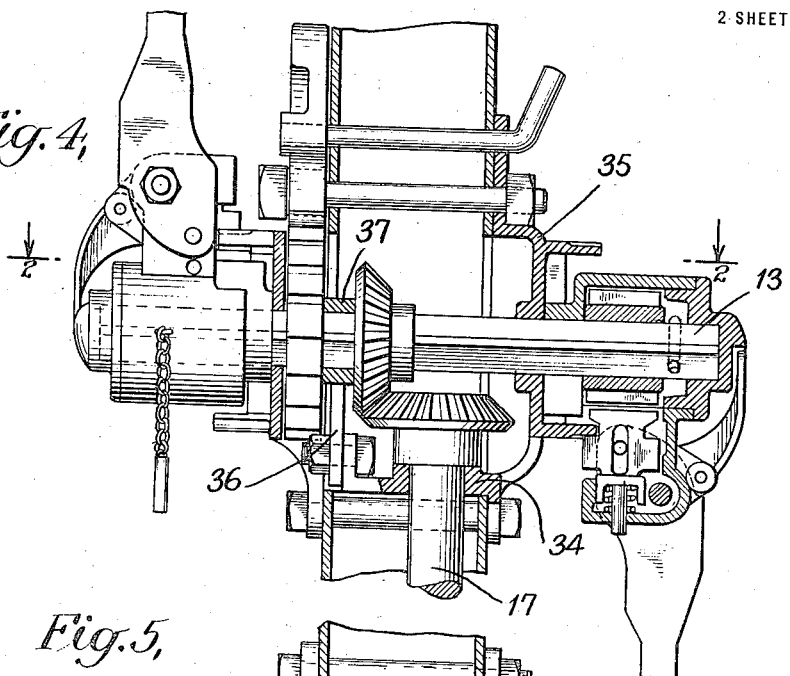
Figure 5:
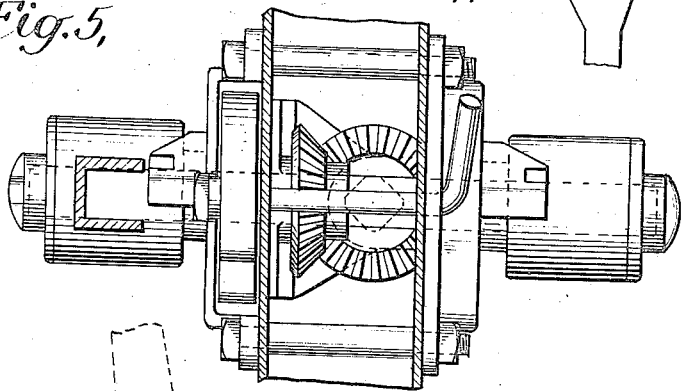
Figure 6:
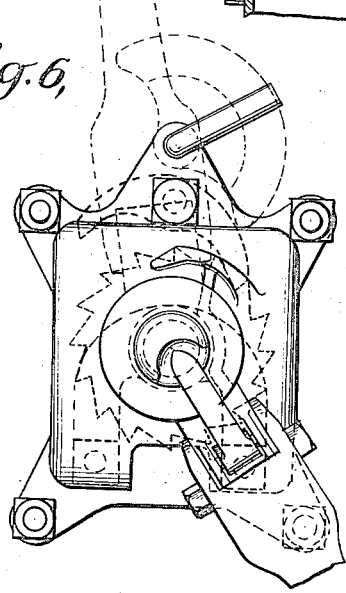

In the accompanying drawings, showing two embodiments of the invention, Figure 1 is a view, partly in side elevation and partly in section, of one form of the improved brake actuating mechanism, Fig. 2 is a sectional view taken on the line 2—2 of Fig. 1, Fig. 3 is an end view thereof, and Figs. 4, 5 and 6 are similar views showing another form of the mechanism.

Referring to the drawings, and more particularly to Figs. 1, 2 and 3, 7 represents the blind end of the car to the outer surface of which brackets 8 and 9 are secured as by means of bolts 10. Each of said bolts is provided with a spacing sleeve 10', as shown. These brackets form a casing, the bracket 8 serving as a cover to prevent dirt, snow, sleet and the like, from having access to the interior thereof. The bracket 9 preferably extends within the end wall thereby reducing the overhang and insuring that the outer ratchet mechanism will not be struck by the next car of the train.

Journaled in bearings 11 and 12 formed in the brackets is a squared shaft 13 with rounded corners, one end of which projects beyond the casing and the other end of which extends through the end wall 7 and into the interior of the car and has a bearing in a bracket 14 secured to the inner surface of the end wall by bolts 10. Mounted upon the shaft 13 and positioned within the casing, is a bevel gear 15 which meshes with a bevel gear 16 secured to the upper end of a vertical brake shaft 17, which is positioned outside of the car body and which is journaled in a bearing 18 formed in the casing. The brake chain is secured to the lower end of the brake shaft 17 in the usual manner.

Hand operated ratchet devices are mounted upon the outer and inner ends of the shaft 13 in order that the brakes may be set either from within or without the car. I prefer to use ratchet mechanism of the general type described and claimed in my United States Letters Patent No. 1,066,702, dated July 8, 1913, but modified to some extent as hereinafter explained. Briefly, this mechanism comprises a handle 19 secured to a hub 20 which is rotatable with respect to the shaft 13 and which carries a pawl 21 adapted to move into and out of engagement with the ratchet 22 secured to the shaft. Two pawl disengaging elements 23 are positioned on opposite sides of the center of oscillation of the handle, each of which is adapted to serve as a disengaging device, and as a limiting stop. By inverting the pawl and ratchet, the operating lever can be arranged to work right handedly or left handedly, and in either case one of the elements 23 will disengage the pawl from the ratchet when the handle 19 is moved back to its extreme position and the other element will limit the movement of the handle in the other direction. For a more complete disclosure of the details of that construction, reference is made to said Letters Patent. The hand levers carried by the shaft 13 are so arranged that one operates right handed and the other left handed. In order to permit the brakes to be released by positive rotation of the shaft 13 in a reverse direction, means are provided for locking the pawl 21 in engagement with the ratchet 22. As shown, this result is attained by providing pawl 21 with a slot 24, the inner end of which is adapted to register with a hole 25 formed in the hub 20, when the pawl is in its innermost or ratchet engaging position. The pawl may then be locked in position by inserting a pin 26 through the hole 25 and the slot 24. The pin is preferably secured to the hub 20 by a chain 27 in order that it will be handy for use.

A ratchet wheel 28 is mounted upon the shaft 13 and is adapted to be engaged by a pawl 29 to prevent reverse rotation of the shaft when the brakes are being set. The pawl, which may be pivotally mounted upon one of the bolts 10, on a suitable bushing, is held in engagement with the ratchet wheel by means of a weight 30 mounted upon a shaft 31 which extends through the end wall of the car and has its outer end bent to form a handle 31 by means of which the shaft may be rotated to bring the weight 30 into engagement with the pawl or with an arm 32 carried thereby.

Under normal conditions, both of the handles 19 of the shaft operating devices are so positioned that their pawls 21 are disengaged from their respective ratchets. The shaft 13 may therefore be rotated to set the brakes by operating either one of the handles 19, it being understood that when either handle is moved from its normal position, the pawl 21 associated therewith will engage the ratchet with which it coacts. As the pawl associated with the other handle is out of engagement with its ratchet, it will not interfere with the rotation of the shaft. After the brakes are set, the handle which was operated is returned to its normal position in which the pawl 21 is disengaged from its ratchet while the pawl 29 which engages the ratchet 28 keeps the brakes set. When it is desired to release the brakes, the shaft 31 is rotated to cause the weight 30 to engage the arm 32, thereby moving the pawl 29 out of engagement with the ratchet wheel 28 and freeing the shaft 13, or if desired, one of the handles 19 may be swung forward until its pawl engages the corresponding ratchet and takes the strain off the holding pawl 29, after which the weight 30 may be rocked to release this pawl.

If desired, the pin 26 may be inserted to lock the pawl 21 in engagement with its coacting ratchet, as above described, after which the handle may be actuated to positively rotate the shaft 13 in a direction to unwind the chain, this being of value when the chain is tangled or for some reason does not freely unwind when the staff is released.

A graduated or progressive release of the brakes may also be obtained either from the inside or outside of the car by means of the pawl releasing levers 33 in a manner well understood in the art.

In the form of the device shown in Figs. 4, 5 and 6, the parts are similar to the form hereinbefore described with the exception that the brake shaft 17 instead of being positioned outside of the car body is positioned between the outer and inner sheathings of the end wall of the car having its outer end journaled in a bearing 34 formed in a bracket 35 secured to the outer surface of the end wall and acting as a cover to the opening formed in the outer sheathing to prevent the entrance of dust, sleet, snow and the like. A bracket 36 is secured to the inner portion of the bracket 35 and is provided with a bearing 37 for the shaft 13. The operation of this form of the device is the same as that described above with respect to the form shown in Figs. 1, 2 and 3.

While both forms of the device are equally efficient as regards their operation, that shown in Figs. 1, 2 and 3 is preferred in view of the fact that the brake shaft, being positioned outside of the car, is more readily available for repairs.

What I claim is:

1. In combination with a car body, a horizontal shaft extending through one of the end walls thereof and carrying a bevel gear, a vertical brake shaft carrying a bevel gear meshing with the first mentioned bevel gear, ratchets secured to the outer and inner ends of the horizontal shaft, and hand actuated means operatively associated with said ratchets for rotating the horizontal shaft from the outside or inside of the car body to set the brakes; substantially as described.

2. In combination with a car body, a horizontal shaft extending through one of the end walls thereof and carrying a bevel gear, a vertical brake shaft carrying a bevel gear meshing with the first mentioned bevel gear, ratchets secured to the outer and inner ends of the horizontal shaft, and hand actuated means operatively associated with said ratchets for rotating the horizontal shaft from the outside or inside of the car body to set the brakes, said hand actuated means operating independently of one another; substantially as described.

3. In combination with a car body, a horizontal shaft extending through one of the end walls thereof and carrying a bevel gear, a vertical brake shaft carrying a bevel gear meshing with the first mentioned bevel gear, ratchets secured to the outer and inner ends of the horizontal shaft, pawls movable into and out of engagement with the ratchets, and hand actuated means for moving either one of said pawls into engagement with its corresponding ratchet and for rotating the horizontal shaft, whereby said shaft may be rotated either from the outside or the inside of the car body to set the brakes; substantially as described.

4. In combination with a car body, a horizontal shaft extending through one of the end walls thereof and carrying a bevel gear, a vertical brake shaft carrying a bevel gear meshing with the first mentioned bevel gear, ratchets secured to the outer and inner ends of the horizontal shaft, pawls movable into and out of engagement with the ratchets, hand actuated means for moving either one of said pawls into engagement with its corresponding ratchet and for rotating the horizontal shaft, whereby said shaft may be rotated either from the outside or the inside of the car body to set the brakes, and means for locking either pawl in engagement with its corresponding ratchet whereby the horizontal shaft may be rotated in the reverse direction by either one of the hand actuated means to release the brakes; substantially as described.

5. In combination with a car body, a horizontal shaft extending through one of the end walls thereof and carrying a bevel gear, a vertical brake shaft carrying a bevel gear meshing with the first mentioned bevel gear, said vertical shaft being positioned outside of the car body, and hand actuated ratchet mechanism mounted upon the inner and outer ends of the horizontal shaft to rotate the same; substantially as described.

6. In combination with a car body, a casing secured to the outer surface of one of the end walls thereof, a horizontal shaft extending through the casing and through said end wall, a gear secured to said shaft within the casing, a vertical brake shaft positioned outside of the car body and having one end extending into the casing, a gear secured to said end of the brake shaft and meshing with the first mentioned gear, and hand actuated ratchet mechanism mounted upon the inner and outer ends of the horizontal shaft to rotate the same; substantially as described.

7. In combination with a car body, a casing secured to the outer surface of one of the end walls thereof and provided with horizontal bearings and a vertical bearing, a horizontal shaft journaled in the horizontal bearings and extending through the casing and through said end wall, a bevel gear secured to said shaft within the casing, a vertical brake shaft positioned outside of the car body and having one end journaled in said vertical bearing and extending into the casing, a bevel gear secured to said end of the brake shaft and meshing with the first mentioned bevel gear, and hand actuated ratchet mechanism mounted upon the inner and outer ends of the horizontal shaft to ratchet the same forward to set the brakes; substantially as described.

In testimony whereof I affix my signature.

ROBERT H. BLACKALL.